(No Model.)
K. B. TUDOR.
FLOWER HOLDER.
No. 451,645. Patented May 5, 1891.
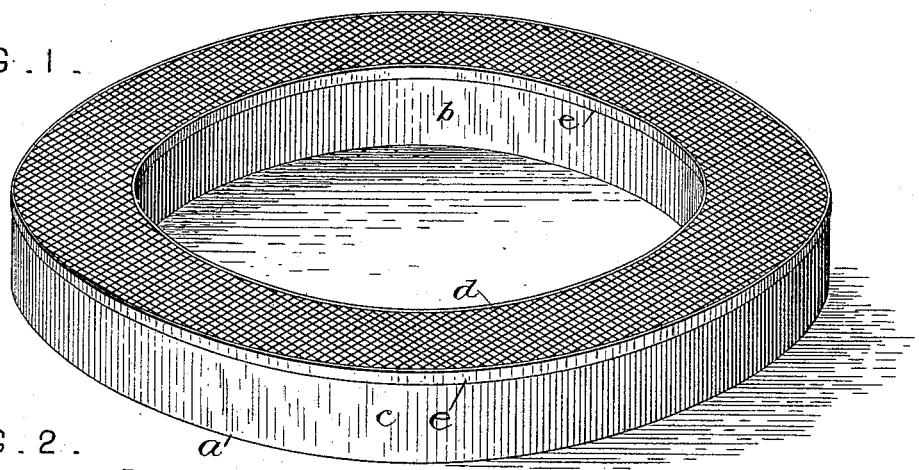
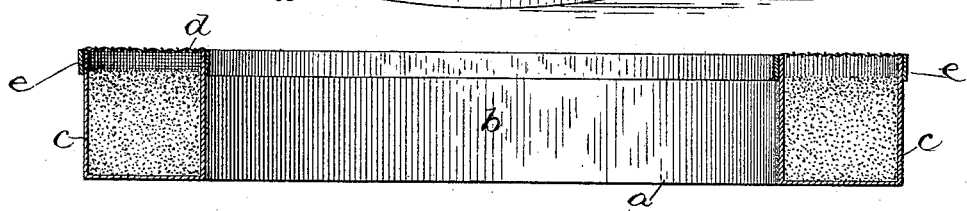
Attest:
Geo. T. Smallwood
James T. DuBois
Inventor
Kate B. Tudor
By R. G. DuBois, Atty
THE NORRIS PETERS CO., PHOTO-LITHO., WASHINGTON, D. C.

United States Patent Office.

KATE B. TUDOR, OF LEXINGTON, KENTUCKY.

FLOWER-HOLDER.

SPECIFICATION forming part of Letters Patent No. 451,645, dated May 5, 1891.

Application filed February 4, 1891. Serial No. 380,147. (No model.)

*To all whom it may concern:*

Be it known that I, KATE B. TUDOR, a citizen of the United States, residing at Lexington, in the county of Fayette and State of Kentucky, have invented certain new and useful Improvements in Flower-Holders; and I do hereby declare the following to be a full, clear, and exact description of the invention, such as will enable others skilled in the art to which it appertains to make and use the same.

My invention has relation to flower-holders, and particularly to such holders as may be employed in the decoration of graves, its objects being the production of such holders as will keep the flowers that are inserted therein beautiful and fresh for a long time, no matter for what purpose, which will prevent the flowers becoming soiled by sinking down into mud or water, which will keep every flower in its place, which can be easily filled with flowers by an unskilled person, which can be made into various fanciful shapes, and which shall be simple in construction, durable, and cheap. I find that such a holder as mine has been a long felt want, as the customary wire frames of the florists used for funeral purposes are of little or no use to the family of the dead person afterward, for after the funeral they are generally placed on the grave and there left until the flowers fade and die, when the whole is thrown away, for to renew the flowers in the frame so that they will make a presentable appearance requires a skilled person, such as a florist; but my holders may be used over and over again, and the flowers may be artistically arranged therein by an unskilled person at the grave without taking the holders to a florist. The holders need not alone be used for decorating graves, as they may be used at funerals, or for any purpose where decoration by means of flowers is desired.

The above being a general outline of the purposes and utility of my invention, I will now proceed to describe the same with reference to the accompanying drawings, in which—

Figure 1 is a perspective view of the preferred form of my invention, and Fig. 2 is a vertical cross-section thereof.

The holders shown in the drawings are of annular shape to form a foundation for a wreath; but it is to be understood that any shape may be adopted—such as a star, cross, anchor, pillow, &c.—providing the same are flat, or substantially so, as while they may hold moist sand yet they are also designed to hold water.

$a$ indicates the imperforate bottom, and $b$ and $c$ the imperforate inner and outer sides of a flower-holder constructed of sheet metal, preferably tin. The edges of the woven-wire top $d$ are pressed over the top edges of and onto the sides $b$ $c$, and are secured by means of strips $e$, soldered to the wire and to the sides. The cross-section of the wire is preferably round, and the meshes of the fabric are in practice preferably from two to three sixteenths of an inch square, or just wide enough to admit the stems of the flowers. The holder is preferably painted green.

To use the holder, water may be poured through the woven-wire top, in which case the holder must be set level, or sand, as shown in Fig. 2, may be sifted in a dry state through the meshes of the wire, and may then be sufficiently moistened so as to remain so for some time, in which case the holder may be inclined, and if the sand is not too wet it may even be set in vertical position. The stems of the flowers are inserted through the meshes of the woven-wire top, wherein they are securely retained, and as the ends of the stems are in the water or moist sand the flowers will keep fresh a long time and may easily be replaced. As the wires are round and without sharp edges the stems will not be cut and thus rendered liable to break. When the sand becomes dry, if it is not desired to moisten it again, it may be sifted out through the meshes of the wire fabric and thus removed from the holder.

It is evident that the holders may be made to hold more water, as by flaring the bottoms.

I am aware that perforated flower-holders which can stand only in vertical position are not new, and I therefore do not claim the same, broadly; but What I do claim as new, and desire to secure by Letters Patent, is—

A flat flower-holder, the same comprising an imperforate bottom and sides and a woven-wire top adapted to hold the stems of the flowers securely in its meshes, substantially as set forth.

In testimony whereof I affix my signature in presence of two witnesses.

KATE B. TUDOR.

Witnesses:
J. B. GORHAM,
E. H. LOGWOOD.